2,179,201

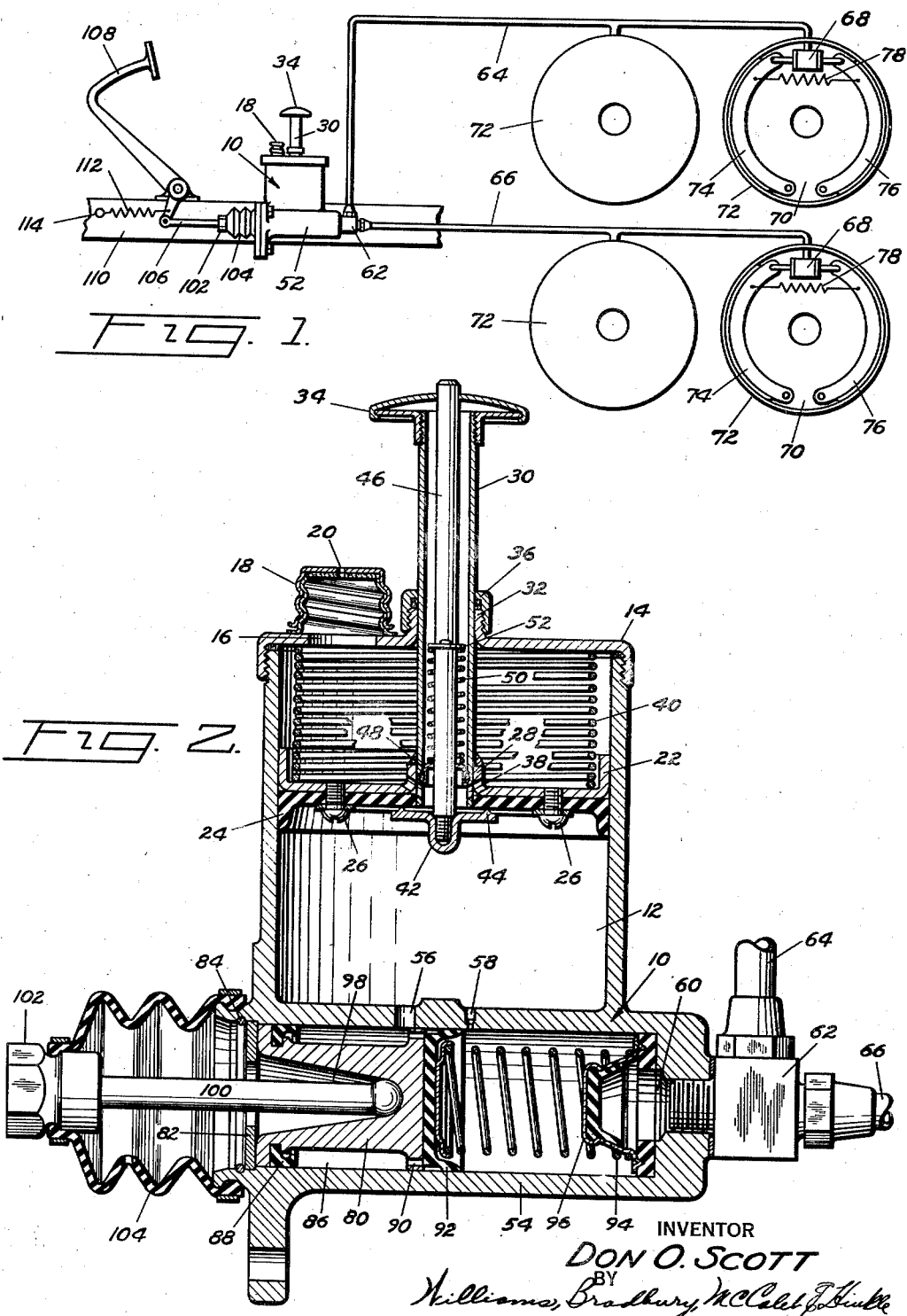
Nov. 7, 1939. D. O. SCOTT 2,179,201
RESERVOIR FOR FLUID PRESSURE SYSTEMS
Filed July 12, 1935
INVENTOR
DON O. SCOTT
ATTORNEYS Patented Nov. 7, 1939

UNITED STATES PATENT OFFICE 2,179,201

RESERVOIR FOR FLUID PRESSURE SYSTEMS

Don O. Scott, Detroit, Mich., assignor to Hydraulic Brake Company, Detroit, Mich., a corporation of California Application July 12, 1935, Serial No. 30,987

3 Claims. (Cl. 60—54.6)

This invention relates to brakes and more particularly to fluid pressure systems for actuating the brakes of motor vehicles.

An object of the invention is to provide a fluid pressure braking system for motor vehicles in which pressure is maintained on the fluid in the system.

Another object of the invention is to provide a fluid pressure braking system for a motor vehicle in which a relatively low pressure is maintained on the fluid in the supply reservoir for the system and a slightly higher pressure is maintained on the fluid pressure delivery pipes or conduits and the fluid pressure actuated motors of the system.

Other objects and structural details of the invention will appear from the subjoined description taken in connection with the accompanying drawing forming a part of this specification, and in which, Fig. 1 is a schematic view of a hydraulic brake system embodying the invention; and Fig. 2 is a vertical sectional view of the master operating unit.

Referring to the drawing for more specific details of the invention, 10 represents a master operating unit including a reservoir 12 having a removable cover 14 provided with a filling opening 16 closed as by a cap 18 provided with a suitable vent 20.

A piston 22 reciprocable in the reservoir carries a leak-proof cup 24, suitably secured on the head of the piston as by screws 26. The piston has a concentric opening registering with a corresponding opening in the leak-proof cup 24, and the perimeter defining the opening is drawn to provide a concentric sleeve 28. This sleeve has welded or otherwise secured thereto one end of a hollow piston rod 30, the other end of which extends through a concentric opening in the cover plate 14 and a sleeve 32 drawn from the perimeter defining the opening. The free end of the piston rod has thereon a knob 34, and threaded on the sleeve 32 is a suitable packing box 36. The piston rod is apertured as at 38 to provide communications between the interior of the piston rod and that portion of the reservoir 12 back of the piston, and a spring 40 interposed between the back of the piston and the cover urges the piston towards the bottom of the reservoir.

A valve 42 controls the open end of the piston rod 30. This valve has an inverted V-shaped annular flange 44 adapted to embed itself in the body of the cup 24 when the valve is in closed position so as to provide a leak-proof seal. The valve 42 has a stem 46 reciprocable in the hollow piston rod 30. As shown, the stem is mounted for reciprocation in a sleeve 48, shown as spot-welded but which may be otherwise secured in the hollow piston rod, and in a concentric opening in the knob 34 on the free end of the rod. The stem extends slightly beyond the knob, and a coil spring 50 is sleeved on the stem between the sleeve 48 and a collar 52 carried by the stem. This spring 50 urges the valve 42 to its closed position.

By pressing on the free end of the valve stem to open the valve 42 and pulling upwardly on the knob 30, fluid in that portion of the reservoir back of the piston 22 may be displaced therefrom through the apertures 38 and hollow piston rod 30 to that portion of the reservoir forward of the piston head.

A cylinder 54 in the bottom of the reservoir has ports 56 and 58 providing communications between the cylinder and the reservoir and a discharge port 60. A fitting 62, threaded in the discharge port, has connected thereto fluid pressure delivery pipes 64 and 66, each connected to one pair of fluid pressure actuated motors 68. One pair of the fluid pressure actuated motors is arranged for the actuation of brakes associated with the front wheels of a motor vehicle, and the other pair is arranged for the actuation of brakes associated with the rear wheels of the vehicle.

Each of the brake structures includes a support or backing plate 70 associated with a rotatable drum 72. The backing plate 70 has pivoted thereon by their articulate ends corresponding friction elements or shoes 74 and 76, adaptable for cooperation with the drum 72, and one of the fluid pressure actuated motors 68 is suitably connected between the separable ends of the friction elements or shoes for spreading the shoes into engagement with the drum against the resistance of a retractile spring 78.

A piston 80 reciprocable in the cylinder is retained against displacement by a washer 82 held against a shoulder in the open end of a cylinder by a split ring 84 seated in a circumferential groove. The piston has a reduced body portion providing in conjunction with the wall of the cylinder an annular chamber 86 communicating with the reservoir 12 by way of the port 56. The skirt of the piston has thereon a leak-proof washer 88 inhibiting seepage of fluid from the cylinder past the piston, and the head of the piston has a plurality of ports 90 providing communications between the annular chamber 86 and that portion of the cylinder forward of the piston. A collapsible leak-proof cup 92 on the head of the piston controls the ports 90. The cup is held against displacement by a spring 94 interposed between the cup and a two-way valve 96 controlling the port 60. The spring 94 also serves to return the piston to its retracted position.

A recess 98 in the back of the piston receives one end of a thrust pin 100, the other end of which is connected to a coupling 102, and a flexible boot 104 connected between the coupling and the open end of the cylinder 54 excludes dust and other foreign substances from the cylinder. The coupling 102 is connected by a rod 106 to a foot pedal lever 108 pivoted on a suitable support 110 and connected by a retractile spring 112 to a fixed support 114.

In operation, assuming that the system including the reservoir 12 is filled with suitable fluid under pressure of the piston 22 in the reservoir and the valve 96 controlling the discharge port 60 of the cylinder 54, the fluid in that portion of the reservoir forward of the piston is retained under a low variable pressure depending upon the position of the piston 22 due to the quantity of fluid in the reservoir forward of the piston and the resultant effect on the spring 40. This pressure may be changed at the will of the operator by simultaneously pressing downward on the valve stem 46 and pulling upwardly on the knob, which results in displacing fluid from that portion of the reservoir back of the piston 22, through the apertures 38 and the hollow piston rod 30, to that portion of the reservoir forward of the piston 22. The pressure in the reservoir forward of the piston 22, and hence in the annular chamber 86, is adequate at all times to maintain sufficient pressure on the washer 88 to expand this washer against the wall of the cylinder 54 to prevent leakage and to insure a rapid feed of fluid from the reservoir to the cylinder during the retraction stroke of the piston 80.

The valve 96 maintains a predetermined pressure on the fluid pressure delivery pipes 64 and 66 and the fluid pressure actuated motors 68, the magnitude of which is dependent upon the tensile strength of the spring 94 acting on the valve 96 and the tensile strength of the retractile spring 78 connecting the separable ends of the friction elements or shoes. It is, of course, to be understood that in instances where the valve 96 is omitted the pressure on the fluid in the system would be equal to the tensile strength of the spring 40 acting on the piston 22 in the reservoir 12, which, as heretofore explained, varies proportionately to variations in the position of the piston 22.

When it is desired to apply the brakes the operator depresses the foot pedal lever 108, and this force is transmitted to the piston 80 to move the piston on its compression stroke. During the initial movement of the piston on its compression stroke, the cup 92 closes the port 58, and, upon further movement of the piston, fluid is displaced from the cylinder 54, past the valve 96, through the fluid pressure delivery pipes or conduits 64 and 66 to the fluid pressure actuated motors 68, causing actuation of these motors, with the resultant spreading of the shoes 74 and 76 into engagement with the drum 72 against the resistance of the retractile springs 78.

Upon release of the foot pedal lever 108 the retractile spring 112 returns this lever to its retracted position, and during this movement of the foot pedal lever the piston 80 is moved to its retracted position under the influence of the spring 94 augmented by pressure on the fluid returning from the fluid pressure actuated motors 68 under the influence of the retractile springs 78 connecting each pair of friction elements or shoes of the respective brakes.

Because of friction on the fluid pressure delivery pipes or conduits 64 and 66 and the tensile strength of the spring 94, the piston 80 is returned to its retracted position slightly in advance of the return of fluid from the fluid pressure actuated motors 68 to the cylinder 54. This causes a partial vacuum in the cylinder 54, resulting in passage of fluid under pressure of the piston 22 from the reservoir 12 through the port 56 to the annular chamber 86, and thence through the ports 90 in the head of the piston, past the collapsible cup 92, to that portion of the cylinder forward of the piston to completely fill the cylinder, and upon return of the piston to its retracted position any excess fluid in the cylinder 54 is discharged therefrom through the port 58 to the reservoir.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. A fluid pressure operated brake system comprising a master cylinder, a piston movable therein, a reservoir for supplying fluid to the cylinder and means for maintaining a pressure on the fluid in said reservoir and cylinder, said last mentioned means including a cover plate for said reservoir, a piston in said reservoir, a hollow piston rod extending through the piston and cover plate and having openings providing communication between the interior of the rod and that portion of the reservoir back of the piston, means for closing the inner end of the rod, and means extending through and beyond the rod for operating said last mentioned means.

2. In a fluid pressure operated brake system, a reservoir, a cover plate therefor, a spring-pressed piston in the reservoir, a hollow piston rod extending through the piston and cover plate and having openings providing communications between the interior of the rod and that portion of the reservoir back of the piston, a spring-pressed valve for closing the inner end of the rod, and a stem for the valve extending through and beyond the rod.

3. In a fluid pressure operated brake system, a reservoir, a cover plate therefor, a spring-pressed piston in the reservoir, a hollow piston rod having one end extending through the piston and its other end extending through the cover plate, said rod having openings providing communications between the interior of the rod and that portion of the reservoir back of the piston, a knob on the free end of the piston rod, a leak-proof cup on the head of the piston having an opening receiving the rod, a spring-pressed valve adapted to seat on the cup and to close the inner end of the rod, and a stem for the valve extending through the rod and knob.

DON O. SCOTT.